(12) United States Patent
Haldimann

(10) Patent No.: US 6,209,712 B1
(45) Date of Patent: Apr. 3, 2001

(54) CONVEYOR FOR CHANNELS BETWEEN STORAGE RACKS

(75) Inventor: Hans-Rudolf Haldimann, Lugano (CH)

(73) Assignee: Gilgen Fordersysteme AG, Oberwangen (CH)

( * ) Notice: Subject to any disclaimer, the term of this patent is extended or adjusted under 35 U.S.C. 154(b) by 0 days.

(21) Appl. No.: 09/091,868
(22) PCT Filed: Oct. 10, 1997
(86) PCT No.: PCT/CH97/00384
§ 371 Date: Jun. 25, 1998
§ 102(e) Date: Jun. 25, 1998
(87) PCT Pub. No.: WO98/19941
PCT Pub. Date: May 14, 1998

(30) Foreign Application Priority Data

Nov. 1, 1996 (CH) .................................................. 2704/96

(51) Int. Cl.[7] .................................................. B65G 25/04
(52) U.S. Cl. ...................... 198/750.1; 198/750.4; 198/817; 198/850; 193/38; 193/3; 193/4; 193/25 FT; 414/267; 414/276; 414/286
(58) Field of Search ................. 198/750.4, 850, 198/817; 193/38, 2 R, 3, 4, 25 FT; 474/202, 231, 152; D15/148; 464/49; 59/78; 414/267, 276, 286

(56) References Cited

U.S. PATENT DOCUMENTS

| 3,134,472 | * | 5/1964 | Schuricht . | |
|---|---|---|---|---|
| 4,688,670 | * | 8/1987 | Lapeyre | 198/853 |
| 4,804,353 | * | 2/1989 | Wenman | 474/152 |
| 4,865,183 | * | 9/1989 | Hodlewsky et al. | 198/834 |
| 5,320,582 | * | 6/1994 | Takeda | 474/140 |
| 5,538,384 | | 7/1996 | Haldimann . | |

* cited by examiner

Primary Examiner—Christopher P. Ellis
Assistant Examiner—Jeffrey A. Shapiro
(74) Attorney, Agent, or Firm—Tarolli, Sundheim, Covell, Tummino & Szabo L.L.P.

(57) ABSTRACT

A conveying apparatus (1) for use in a shelf channel of rack storage facilities. The conveying apparatus (1) comprises circulating conveying means (2) for conveying and storing goods. The conveying means (2) is an endless loop formed partially by a roller chain (3) and partially by a tape (4). The roller chain (3) includes a plurality of chain links. Adjacent chain links are interconnected by an axes of a roller. The plurality of interconnected chain links includes two end links (31, 32). The end links (31, 32) are interconnected by the tape (4). A rail (10) extends linearly and supports a portion of said endless loop. The rail (10) has a loading/unloading end where the goods are loaded onto said conveying means (2) and unloaded from said conveying means (2). The rail (10) includes a first and a second deflection member (5, 6). The first deflection member (5) is located in a region of the loading/unloading end and the second deflection member (6) is located in a region remote from the loading/unloading end. The first deflection member (5) is a stationary and non-rotating deflection member and includes a substantially round front face (28) and a top side having a recess (26). The first deflection member (5) is adopted to cooperate with adjacent rollers of a respective chain link such that during unloading of the goods the chain link is lowered immediately prior to deflection operation.

2 Claims, 2 Drawing Sheets

CONVEYOR FOR CHANNELS BETWEEN STORAGE RACKS

FIELD OF THE INVENTION

The present invention refers to a conveying apparatus for shelf channels of rack storage facilities.

BACKGROUND OF THE INVENTION

Conveying apparatuses for shelf channels of rack storage facilities of the kind discussed herein usually comprise two parallelly arranged, circulating conveying means by means of which the goods can be loaded into and unloaded from the individual shelf channels. The one half of the conveying means receiving the goods to be loaded is designed, in most cases, as a roller or supporting roller chain, while the other half is designed as tape. This arrangement lowers the costs and saves weight. However, such a design requires that one of the deflections must be adapted to a chain and the other one to a tape. In practice, the result is that the path of displacement of the chain is strictly limited to a value that is less than the distance between the centers of the front and the rear displacement, while the total length of the particular shelf channel is more than this distance. Thereby, there is a high risk that the path of displacement induced by the unloading vehicle during loading and unloading of goods is greater than the predetermined path of displacement of the conveying means. Thereby, the conveying means and/or the deflections often is/are damaged because the forces exerted by an unloading vehicle, e.g. a fork lift truck, can be very high.

Thus, the necessity is compellingly given that the chain is longer than the distance between the centers of the deflections. However, in the existing systems, this is not possible because the particular deflection can deflect only either the chain or the tape.

A further problem arising in connection with such conveyors consists in that the two conveying means, e.g. during the loading of goods, are very frequently not parallelly moved, but the one conveying means is forwarded somewhat more than the other one. Small differences can sum up in time to a great offset between the two conveying means, thereby further increasing the danger of a damage.

In order to ensure a reliable non-positive connection between the pallets put onto the conveying means and the chains, the individual chain links are provided with acute projections which engage the wooden material of the pallets. In this connection, a further well known problem arises inasmuch as the individual chain links rotate in relation to each other upon deflection. Such rotation leads to a relative displacement of the projections from one chain link to the other one. Since the pallet simultaneously rests both on the chain links rotating away during deflection as well as on the immediately subsequent horizontal chain link, wooden splinters are broken out of the pallet during the deflection operation. It is understood that this is undesired.

Thus, it is a task of the invention to propose a conveying apparatus for shelf channels of rack storage facilities that can be manufactured at low costs and simultaneously ensures a gentle, reliable and safe operation.

SUMMARY OF THE INVENTION

A conveying apparatus for use in a shelf channel of rack storage facilities. The conveying apparatus comprises circulating conveying means for conveying and storing goods. The conveying means is an endless loop formed partially by a roller chain and partially by a tape. The roller chain includes a plurality of chain links. Adjacent chain links are interconnected by an axes of a roller. The plurality of interconnected chain links includes two end links. The end links are interconnected by the tape. A rail extends linearly and supports a portion of said endless loop. The rail has a loading/unloading end where the goods are loaded onto said conveying means and unloaded from said conveying means. The rail includes a first and a second deflection member. The first deflection member is located in a region of the loading/unloading end and the second deflection member is located in a region remote from the loading/unloading end. The first deflection member is a stationary and non-rotating deflection member and includes a substantially round front face and a top side having a recess. The first deflection member is adopted to cooperate with adjacent rollers of a respective chain link such that during unloading of the goods the chain link is lowered immediately prior to deflection operation.

In one embodiment of the invention, the recess of the first deflection member has a length that is shorter than a distance between axes of adjacent rollers. A horizontal distance between an end of the recess nearest to the loading/unloading end and the front face of the first deflection member is shorter than the distance between axes of adjacent rollers.

In another embodiment of the invention, The first deflection member has a pair of ramps. A first ramp forms an end of the recess opposite the loading/unloading end and a second ramp connects the top side and the front face of the first deflection member. The first ramp and the second ramp have corresponding height levels. A horizontal distance separating the corresponding height levels of the first and second ramps approximately corresponds with a distance between axes of adjacent rollers.

BRIEF DESCRIPTION OF THE DRAWINGS

In the following, an embodiment of the invention shall be further explained with the aid of drawings. In these drawings.

FIG. 1b shows a longitudinal sectional view of the drum according to FIG. 1a;

FIG. 1c shows a cross sectional view of the drum according to FIG. 1a;

DETAILED DESCRIPTION OF THE PREFERRED EMBODIMENTS

Figure 1:
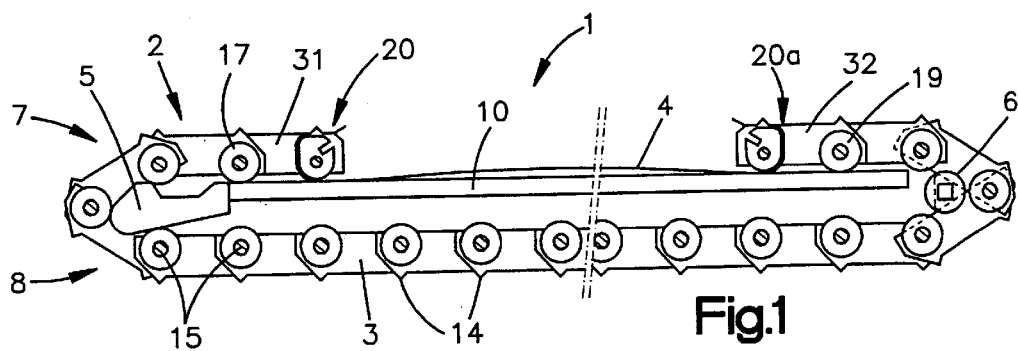
FIG. 1 shows a schematically illustrated conveying means of a rack channel in a longitudinal sectional view.

FIG. 1 shows a longitudinal sectional view of a schematically illustrated conveying means 2 of a conveying apparatus 1 that is used in a shelf channel of a storage rack facility. Moreover, in FIGS. 1a and 1b, enlarged partial views of FIG. 1 are illustrated, while the drum can be seen in FIG. 1c in a cross sectional view that is even more enlarged.

In order to ensure that goods can be stored in and removed from a shelf channel one after the other one, each shelf channel is provided with a conveying apparatus 1 substantially constituted of two circulating conveying means 2 disposed parallel to each other. As the real supporting element of this conveying means 2, a roller chain 3 is provided. In order to optimize costs and weight, the conveying means 2 is designed so that half of its length is a chain 3 and half is a tape 4. The two end chain links 31, 32 of this chain 3 are interconnected by means of a tape 4. For deflecting the conveying means 2, there is provided a front deflection 5 facing the unloading end of the shelf channel as well as a rear deflection 6 remote from the unloading end of the shelf channel. The front deflection consists of a shaped profile element 5 disposed in a stationary and non-rotating manner, while the rear deflection is constituted by a drum 6. The conveying means 2 is subdivided into a lower run 8 and an upper run 7. The lower run 7 is differentiated from the upper run 8 at the location of the two deflections 5,6. As a track for the upper run 7 of the chain 3, there is provided a rail 10. The lower run 8 of the chain 3 is supported at the bottom side of the rail 10 by means that are not further illustrated.

The particular chain links of the roller chain 3 are provided at their upper sides with acutely tapered projections 14. These projections 14 ensure a reliable, non-positive connection between the chain 3 and the goods resting thereon, whereby the goods usually are received on pallets that can be engaged by the projections 14. In FIG. 1, the chain 3 is illustrated in its front end position in which no goods are stored in the corresponding shelf channel as yet.

Figure 1A:
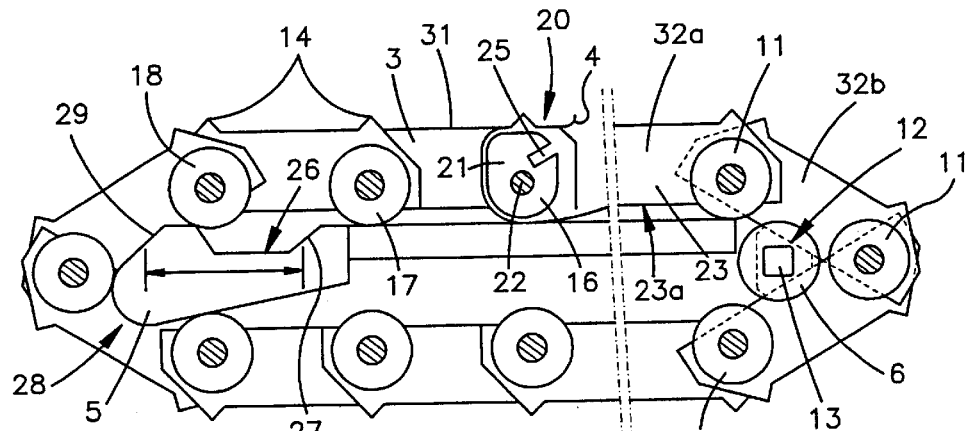
FIG. 1a shows an enlarged illustration of the front and rear deflections.
Figure 1B:
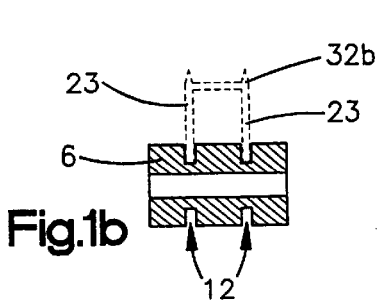
Figure 1C:
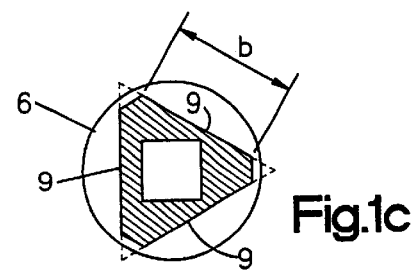
Figure 4:
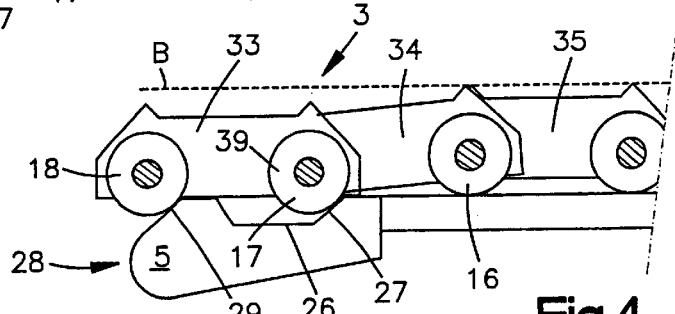
FIG. 4 shows the front end of the conveying means in a second phase during the deflection operation.

The shaped profile element 5 provided as the front chain deflection is shown in FIG. 1a in an enlarged view. At the top side of this shaped profile element 5, there is provided a recess 26, while the front face 28 is shaped substantially round. At the beginning of the recess 26, as seen in the direction of the displacement of the chain 3 during the unloading of goods, a ramp 27 is provided over which the supporting roller 17 of the particular chain links can roll into the recess 26. A second ramp 29 is provided as a transition between the top side of the shaped profile element 5 and its front face 28. It is important that the slope of ramp 27 corresponds with the slope of ramp 29 and that a point upon each ramp separated by the distance between the axes of adjacent rollers, shown as a in FIG. 1a, is at the same height. Thus, as shown in FIG. 4, as the rollers 17, 18 of each chain link 33 move along the ramps 27, 29, the chain link 33 remains in a horizontal position.

The exact sequence of the deflection operation of the chain 3 by means of that shaped profile element 5 will be further explained with reference to FIGS. 3 to 7 herein after.

The rotating drum 6 comprises two parallel, slot-like grooves 12 which engage the lateral walls 23 of the individual chain links. These slots 12 are machined into the drum 6 such that the sections of the slot bottoms 9 form an isosceles triangle (FIG. 1c) whose corners, however, are somewhat chamfered The length b of the leg of a section of the slot bottom 9 up to the theoretical corners of the triangle substantially corresponds to half of the distance between the axes of two adjacent supporting rollers 17, 18. In this way, it is achieved that the sections of the slot bottoms positively cooperate with the central bottom sides 23a of the lateral walls 23 of a chain link 31, 32b, whereby a non-positive connection between chain 3 and drum 6 results; it should be noted that the drum 6 is shown in a longitudinal sectional view in FIG. 1b. Moreover, in FIG. 1b a chain link 32b is schematically outlined whose lateral walls 23 engage the slots 12 of the drum 6 during the deflection.

Instead of being a drum 6, the rear deflection could be designed as a roller, for example, which comprises several peripheral recesses that are positively engaged during the deflection by the rollers or the supporting rollers of the chain 3.

For coupling the two rollers 6 of a pair of the conveying means, each drum 6 is provided with a rectangular aperture 13 that is positively engaged by a correspondingly rectangularly shaped tube. In order to bring the two drums in a defined position relative to each other during the mounting operation, the rectangular tube is preferably provided with a slot adapted to be engaged by a projection provided at the particular drum 6. It was abstained from illustrating these elements.

In the front end position of the conveying means 2 shown in FIG. 1, the chain 3 encloses the drum 6. By this enclosing and by the coupling of the two drums 6, the pair of conveying chains of the conveying apparatus 1 is inevitably coupled together. In this way, it can be ensured that the two conveying means are synchronously displaced at the beginning of the loading operation, if the particular shelf channel is still empty, even if a displacement force is exerted only to one of these two conveying means. Goods loaded onto the two conveying means simultaneously rest on the chain of each conveying means. The goods couple the two conveying means together such that they move in a synchronized manner.

As the drum 6 is wider than the tape 4, the latter one has not to be guided laterally during deflection, but can laterally move along the axis of the drum. In this way, the tape 4 can be gently deflected. In order to avoid undesired tensional forces at the transition from the chain 3 to the tape 4 during deflection, the tape 4 is fixed in the last chain link 31, 32 and guided out of the last chain link 31, 32 in the region of the rail 10 for supporting rollers 17, 19.

For fixing the tape 4, the two last chain links 31, 32 are provided each with a tensioning and fixing device 20, 20a. For this purpose, an eccentric element 21 is provided in the chain link 31 instead of the supporting roller; the eccentric element 21 is rotatably supported on an axis 22. The tape 4 is clamped between the eccentric element 21 and the chain link 31. For rotating the eccentric element 21, it is provided with a slot 25 in which a tool, acting as a lever, can be inserted. Thereby, the eccentric element 21 can easily be rotated and, thereby, the tape 4 clamped and released from between a surface of the eccentric element 21 and the chain link 31, respectively. The eccentric element 21 being released from clamped connection with the chain link 31, the tensioning of the tape 4 can be manually performed. In order to ensure an improved frictional connection between eccentric element 21 and tape 4, the eccentric element 21 is provided preferably with a rough surface at its top side, for example in the form of grooves which extend laterally with respect to the rail 10. For a torsionally fixed locking of the eccentric element 21, moreover, screw means can be provided which are, however, not further illustrated. The screw means of the eccentric element 21, respectively, can be designed as end stop members for the chain 3 by towering above the chain link 31 at the two outer sides. A corresponding counterpart can be provided in the shelf channel that can be engaged by the portions of screw means towering above the chain link 31. The displacement path of the chain 3 along the rail 10 can be limited by the location of the end stop members. The stop members are not shown in favor of an open and clear illustration.

Figure 2:
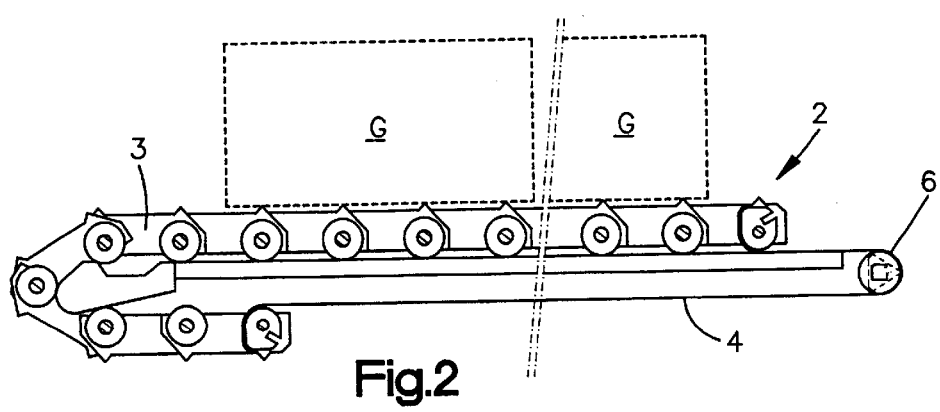
FIG. 2 shows the conveying means according to FIG. 1 in a displaced position.

FIG. 2 shows the conveying element in a position displaced with regard to the position shown in FIG. 1. In the view of FIG. 2, goods G are schematically shown that rest on the chain 3 and are stored in the particular shelf channel. Usually, the goods G are not put directly onto the chains 3, but in each case onto a pallet which, in turn, rests on the chain 3. Since such pallets are known for along time, they are not shown in the drawing.

The loading of goods G is performed from the left side such that these goods are put onto the chain 3 by means of a floor conveying vehicle, e.g. a fork lift truck, and pushed into the shelf channel. If goods G are stored, as outlined in the present example, a non-positive connection is established by them between the two conveying means. Thus, it does not matter that, as outlined here, the tape 4 is deflected around the drum 6 such that a positive or non-positive connection between the conveying means 2 and the drums 6 does not exist anymore.

The principle of the deflection process of the chain 3 at the front deflection means, designed as shaped profile element 5, shall be further explained with reference to FIGS. 3 to 7. For this purpose, in each case some chain links 33, 34, 35 are shown schematically in different phases prior to and during the deflection operation.

Figure 3:
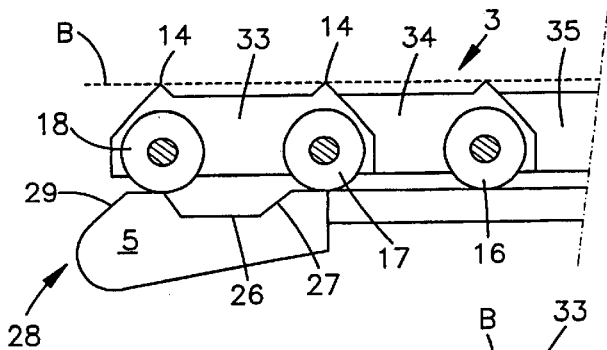
FIG. 3 shows the front end of the conveying means in a first phase immediately prior to the deflection operation.

FIG. 3 shows the initial state in which the frontmost chain link 33 is in a horizontal position and at the same height as the subsequent chain links 34, 35. In order to be in a position to better explain the cooperation of the chain 3 with the goods received thereon, a bottom board B of a pallet is illustrated that rests on some of the chain links. Upon displacing the chain 3 into the position shown in FIG. 4, the frontmost chain link 33 is lowered without rotating around its lateral axis. This is due to the fact that both rollers 17, 18 simultaneously move downwards. The rear roller 17 rolls along the ramp 27 downwards, while the front roller 18 simultaneously rolls along the ramp 29 located at the front face 28 of the shaped profile element 5 downwards. By lowering the frontmost chain link 33, the non-positive connection between this frontmost chain link 33 and the bottom board B of the pallet is released.

Figure 5:
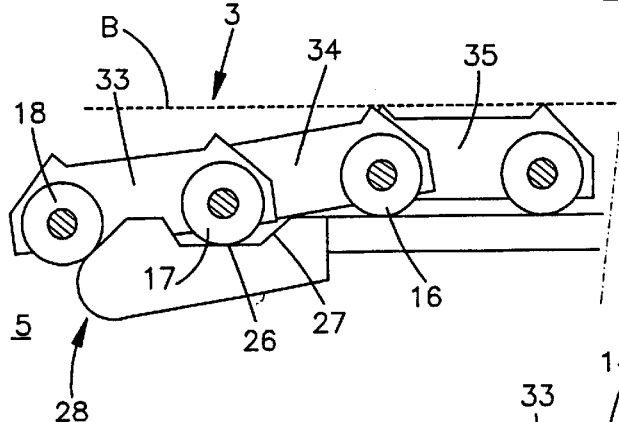
FIG. 5 shows the front end of the conveying means in a third phase during the deflection operation.

If the chain 3 is now further displaced into the position shown in FIG. 5, the frontmost chain link 33 begins to rotate downwards around the axis of its rear roller 17. Since the frontmost chain link 33 is lowered with regard to the subsequent chain links 34, 35, it is no longer in touch with the bottom board B of the pallet; thus, upon rotation, no splinters are broken out of the bottom board B.

Figure 6:
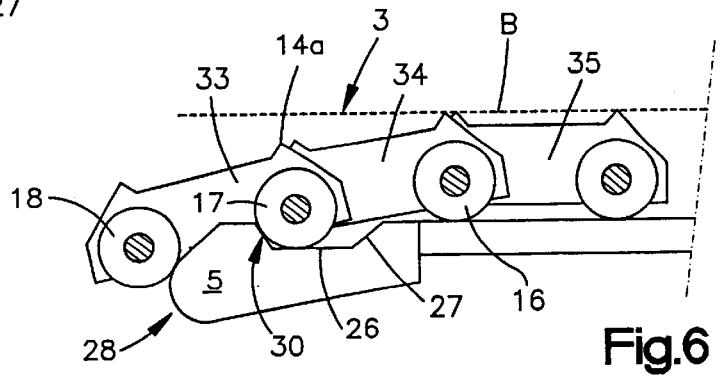
FIG. 6 shows the front end of the conveying means in a fourth phase during the deflection operation.

As soon as the front most chain link 33 is rotated into the position shown in FIG. 6, its rear roller 17 drives upwards along the slope 30 located at front end of the recess 26, whereby the rear acute projection 14a of the frontmost chain link 33 does not contact the bottom board B of the pallet.

Figure 7:
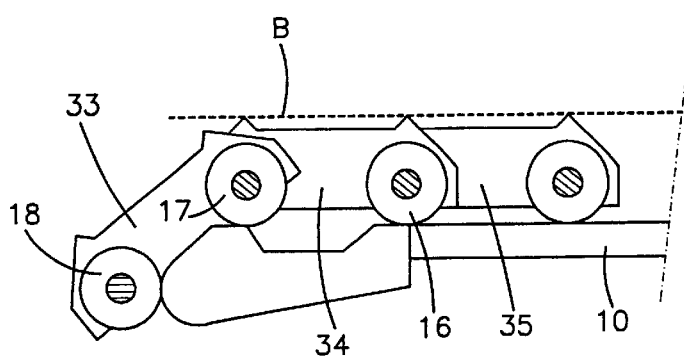
FIG. 7 shows the front end of the conveying means in a fifth phase during the deflection operation.

FIG. 7 shows a situation in which the rear roller 17 again is in the height of the surface of the rail 10. In this illustration, it can be clearly seen that the rear projection does not contact the bottom board B of the pallet anymore.

The effect explained herein before, of course, can be observed as well if the chain 3 is displaced in the other direction, i.e. to the right, whereby goods are loaded instead of unloaded.

To sum up, it can be stated that a gentle and safe operation of the conveying apparatus is ensured with the help of the proposed deflection means. Particularly, the rear rotatable deflection can deflect the chain as well as the tape. By the coupling of the two conveying means at the beginning of the loading of goods, it is ensured that they are synchronously moved in each case. Moreover, by the particular design of the front deflection means, it is achieved that the pallets are gently handled during the loading and unloading operation, whereby it is ensured that no splinters are broken out. Finally, due to the proposed arrangement and design of the tensioning and fixing means, the tension of the particular conveying means can be adjusted to the requirements in a simple way.

What is claimed is:

1. A conveying apparatus for use in a shelf channel of rack storage facilities, said conveying apparatus comprising:

circulating conveying means for conveying and storing goods, said conveying means being an endless loop formed partially by a roller chain and partially by a tape, said roller chain including a plurality of chain links, adjacent chain links being interconnected by an axes of a roller, said plurality of interconnected chain links including two end links, said end links being interconnected by said tape;

a rail extending linearly and supporting a portion of said endless loop, said rail having a loading/unloading end where the goods are loaded onto said conveying means and unloaded from said conveying means;

said rail including a first and a second deflection member, said first deflection member being located in a region of said loading/unloading end and said second deflection member being located in a region remote from said loading/unloading end;

said first deflection member being a stationary and non-rotating deflection member and including a substantially round front face and a top side having a recess, said first deflection member being adopted to cooperate with adjacent rollers of a respective chain link such that during unloading of the goods said chain link is lowered immediately prior to deflection operation;

said recess of said first deflection member having a length that is shorter than a distance between axes of adjacent rollers, a horizontal distance between an end of said recess nearest to said loading/unloading end and said front face of said first deflection member being shorter than the distance between axes of adjacent rollers.

2. A conveying apparatus for use in a shelf channel of rack storage facilities, said conveying apparatus comprising:

circulating conveying means for conveying and storing goods, said conveying means being an endless loop formed partially by a roller chain and partially by a tape, said roller chain including a plurality of chain links, adjacent chain links being interconnected by an axes of a roller, said plurality of interconnected chain links including two end links, said end links being interconnected by said tape;

a rail extending linearly and supporting a portion of said endless loop, said rail having a loading/unloading end where the goods are loaded onto said conveying means and unloaded from said conveying means;

said rail including a first and a second deflection member, said first deflection member being located in a region of said loading/unloading end and said second deflection member being located in a region remote from said loading/unloading end;

said first deflection member being a stationary and non-rotating deflection member and including a substantially round front face and a top side having a recess, said first deflection member being adopted to cooperate with adjacent rollers of a respective chain link such that during unloading of the goods said chain link is lowered immediately prior to deflection operation;

said first deflection member having a pair of ramps, a first ramp forming an end of said recess opposite said loading/unloading end and a second ramp connecting said top side and said front face of said first deflection member, said first ramp and said second ramp having corresponding height levels, a horizontal distance separating said corresponding height levels of said first and second ramps approximately corresponding with a distance between axes of adjacent rollers.

* * * * *